United States Patent [19]

Sanford

[11] Patent Number: 5,504,890
[45] Date of Patent: Apr. 2, 1996

[54] SYSTEM FOR DATA SHARING AMONG INDEPENDENTLY-OPERATING INFORMATION-GATHERING ENTITIES WITH INDIVIDUALIZED CONFLICT RESOLUTION RULES

[76] Inventor: Michael D. Sanford, 4309 Oldfield Dr., Arlington, Tex. 76013

[21] Appl. No.: 214,690

[22] Filed: Mar. 17, 1994

[51] Int. Cl.$^6$ ........................................... G06F 17/30
[52] U.S. Cl. ................ 395/600; 395/200.09; 395/934; 364/282.4; 364/274.5; 364/276.4; 364/DIG. 1; 364/282.4; 364/274.5; 364/276.4; 364/972.3; 364/974.7
[58] Field of Search ........................... 395/600, 200.03, 395/200.09, 934; 364/282.4, 274.5, 276.4, 972.3, 974.7

[56] References Cited

U.S. PATENT DOCUMENTS

| | | | |
|---|---|---|---|
| 4,604,686 | 8/1986 | Reiter et al. | 395/500 |
| 5,241,675 | 8/1993 | Sheth et al. | 395/600 |
| 5,283,856 | 2/1994 | Gross et al. | 395/51 |
| 5,305,196 | 4/1994 | Deaton et al. | 364/401 |
| 5,369,763 | 11/1994 | Biles | 395/600 |

OTHER PUBLICATIONS

Li et al., "Using Field Specifications to Determine Attribute Equivalence in Heterogeneous Databases" 20 Apr. 1993 pp. 174–177, IEEE.

Tsaz et al., "Querying Uncertain Data in Heterogeneous Databases", 20 Apr. 1993 pp 161–168, IEEE, Proceedings RIDE–IMS '93 Third International Workshops.

Pane et al. "Semantic Query Processing in Multidatabase Systems", A Logic–Based Approach 16 Apr. 92, pp. 318–324, IEEE.

*Primary Examiner*—Thomas G. Black
*Assistant Examiner*—Jack M. Choules

[57] ABSTRACT

A system is provided for sharing data among cooperating but independently-operating data-gathering contributors. Each contributor maintains a database with information therein which pertains to monitored entities. The information is arranged in data fields. In each database, a contributor-specific subset of the data fields is identified which contains information about the monitored entities which is uniquely associated with a particular one of the cooperating but independently-operating data-gathering contributors. For each database, a monitored-entity subset of data fields is identified which contains information about the monitored entities which is not uniquely associated with one of the cooperating but independently-operating data-gathering contributors, and which appears in the databases. A viewing prioritization rule set is derived for each of the cooperating but independently-operating data-gathering contributors. A record management program is provided which is executed by a data processing system. The record management program includes a search routine which responds to a search query of a particular contributor by retrieving data. The data processing system further includes a view routine which assembles data for display in accordance with the viewing prioritization rule set associated with the contributor, and which automatically resolves conflicts between information in the monitored-entity subset of data fields in accordance with the viewing prioritization rule set.

15 Claims, 12 Drawing Sheets

| 01234567 | JOHN ROB SMITH | 132-45-6789 | 11/07/1960 | |

| 01234567 | 15 | Step 1 Reg | 01/15/1991 | 65 | 07/11/1960 | ←271 |
| 01234567 | 11 | Brd Action | 08/17/1993 | 85 | 11/07/1960 | ←273 |

| 01234567 | 15 | Step 1 Reg | 01/15/1991 | 65 | 123-45-6789 | ←275 |
| 01234567 | 13 | Step 2 Reg | 09/20/1992 | 80 | 13☒5-6789 | ←277 |

| 01234567 | 15 | Step 1 Reg | 01/15/1991 | 70 | JOHN B SMITH | ←279 |
| 01234567 | 13 | Step 2 Reg | 09/20/1992 | 80 | JOHN R SMITH | ←281 |
| 01234567 | 11 | Step 3 Reg | 02/26/1993 | 70 | JOHN R SMTIH | ←283 |
| 01234567 | 11 | Brd Action | 08/17/1993 | 85 | JOHN ROB SMITH | ←285 |

1. FOR DATE OF BIRTH CONFLICT:
    - X  (a) Select data from contributor ( 3 ) over that of other contributors;
    - _  (b) Select data with maximum ranking value, if none of (___)
         records have that data;
    - _  (c) Select data from earliest record;
    - _  (d) Select data with maximum ranking value only;
    - _  (e) Select data from most recent record;
    - _  (f) Select data from contributor (___) if source is (___).

2. FOR SOCIAL SECURITY NUMBER CONFLICT:
    - _  (a) Select data from contributor (___) over that of other contributors;
    - _  (b) Select data with maximum ranking value, if none of (___)
         records have that data;
    - X  (c) Select data from earliest data;
    - _  (d) Select data with maximum ranking value only.

3. FOR NAME CONFLICT:
    - _  (a) Select data from contributor (___) over that of other contributors;
    - _  (b) Select data with maximum ranking value;
    - X  (c) Select data with greatest number of records associated
         therewith.

FIGURE 6B

SYSTEM FOR DATA SHARING AMONG INDEPENDENTLY-OPERATING INFORMATION-GATHERING ENTITIES WITH INDIVIDUALIZED CONFLICT RESOLUTION RULES

BACKGROUND OF THE INVENTION

1. Field of the Invention

The present invention relates in general to data processing systems, and in particular to the creation and utilization of databases.

2. Description of the Prior Art

Over the last ten to twenty years substantial investments have been made by governments and private entities in the creation and maintenance of databases which contain information pertaining to a particular entity or activity which is being monitored. For example, a wide variety of governmental entities have established and maintained databases which contain information pertaining to the arrest and conviction records of criminals. Yet other governmental databases maintain information pertaining to the driving histories of licensed drivers. Still other databases contain information pertaining to active and discharged military personnel. Still other databases contain information pertaining to the work histories of federal, state, and local governmental unit employees. Many professions exist which are substantially self-regulated, including the legal and medical professions, as well as the accounting and engineering professions, requiring the creation of massive databases.

Difficulties arise when governmental and/or private entities attempt to share information which is contained in their respective databases. Since substantial sums have been invested in the creation of the databases, it is impractical to start over and create a commonly-owned and commonly-maintained database. Therefore, most collaborative efforts result in some attempt to pass information contained in particular data fields from one entity to the other. Unfortunately, most databases have such a rigid construction that they do not easily accommodate additional data fields. Additionally, such conversion efforts typically cannot be performed without considerable problems and frequently require that the information contained in the data fields be reviewed by human operators to ensure that the data is sensible and accurate. This is labor intensive and correspondingly expensive.

SUMMARY OF THE INVENTION

It is one objective of the present invention to provide a method and apparatus for sharing data among a plurality of cooperating but independently-operating data-gathering contributors, which allows each contributor to autonomously maintain its respective database, while allowing all contributors to share information contained therein which pertains to particular monitored entities of interest.

It is yet another objective of the present invention to provide a method and apparatus for sharing data among a plurality of cooperating but independently-operating data-gathering contributors which allows each contributor to derive a viewing prioritization rule set, which can be utilized to determine what information is provided to that particular contributor in response to a search query.

It is still another objective of the present invention to provide a method and apparatus for sharing data among a plurality of cooperating but independently-operating data-gathering contributors, which includes a record management program which is executed by a data processing system which includes: (1) a search routine which responds to a search query from a particular contributor by retrieving data, and (2) a view routine which assembles data for display in accordance with a particular viewing prioritization rule set associated with the particular contributor which originated the search query, and which automatically resolves conflicts between information in a particular subset of a plurality of data fields in accordance with the particular viewing prioritization rule set.

These and other objectives are achieved as is now described. A method and apparatus is provided for sharing data among a plurality of cooperating but independently-operated data-gathering contributors. Each contributor maintains a database with information therein pertaining to a plurality of monitored entities. The data is arranged in a plurality of data fields. Before and after the collaboration, each particular contributor maintains autonomy over its database, and may add, delete, or modify data entries typically without involvement or collaboration with the other contributors. In accordance with the present invention, however, each contributor is restricted from altering the data items which are uniquely attributable to other contributors.

In accordance with the present invention, for each database, a contributor-specific subset of data fields is identified which contains information about the plurality of monitored entities which is uniquely associated with a particular one of the plurality of cooperating but independently-operating data-gathering contributors. This contributor-specific subset of data fields may be altered only by the particular contributor with which it is associated. Also, in accordance with the present invention, for each database a monitored-entity subset of the plurality of data fields is identified which contains information about the plurality of monitored entities which is not uniquely associated with a particular one of the plurality of cooperating but independently-operating data-gathering contributors, and which appears in a plurality of the databases.

A viewing prioritization rule set is derived for each of the cooperating but independently-operating data-gathering contributors. A data processing system is provided, as is a record management program which is executed by the data processing system. The record management program includes a search routine which responds to a search query from a particular contributor by retrieving data. The record management program also includes a view routine which assembles data for display in accordance with the particular viewing prioritization rule set associated with the particular contributor which originated the search query. The particular viewing prioritization rule set automatically resolves discrepancies and inconsistencies between information in the monitored-entity subset of the plurality of data fields. Therefore, the contributor which originated the search query is presented with information which may conflict with information contained in one or more of the databases, with the conflict being resolved in accordance with a predetermined and predefined rule set which identifies the type or types of data which are preferred by the contributor which has initiated the search query. For example, for some types of information, the contributor may trust one or more of the other contributors more than other particular contributors. Alternatively, the contributor may prefer information from particular sources. Alternatively, the contributor may prefer information from particular time intervals over information from other particular time intervals.

In operation, a search query is directed from a particular contributor to the data processing system. The query requests information about a particular one of a plurality of monitored entities. The data processing system is utilized to retrieve data pertaining to the particular one of the plurality of monitored entities. Then, the data processing system is utilized to determine if inconsistencies exist between information in the monitored entity-subset of the plurality of data fields. If inconsistencies exist, the conflict is automatically resolved in accordance with the particular viewing prioritization rule set associated with the contributor which initiated the search request. Finally, the data processing system is utilized to direct information from the data processing system to the particular contributor.

As an alternative to searching the entire pool of records pertaining to the monitored entities, the present invention allows the creation, maintenance, and searching of a one-dimensional "flat" view file which is constructed in accordance with a particular viewing prioritization rule set. Of course, there may be multiple one-dimensional flat view files, each constructed in accordance with a different viewing prioritization rule set. The one-dimensional flat view files may be maintained by a single data processing system, or may be distributed among a plurality of independently-operating data-gathering contributors, or third parties. The viewing prioritization rule set which is utilized to create the one-dimensional flat view file may be a viewing prioritization rule set which is created by a particular one of the independently-operating data-gathering contributors, or may be a composite based upon a plurality of viewing prioritization rule sets of a plurality of independently-operating data-gathering contributors. In the alternative, the one-dimensional flat view file may be constructed in accordance with a viewing prioritization rule set established by third-parties, which are allowed access to the file by the cooperating independently-operated data-gathering contributors. Utilization of one-dimensional flat view files speeds the execution of searches, since the amount of data processed is reduced significantly.

In the preferred embodiment of the present invention, the record management program further includes an identification block generator routine which generates a unique identifier for each of a plurality of monitored entities in the databases of the plurality of cooperating but independently-operating data-gathering contributors. Preferably, the unique identifier comprises alphanumeric tags which may be utilized to facilitate searching operations. In the particular embodiment of the present invention which is described herein, the unique identifier includes an alphanumeric identification of the particular monitored entity, an alphanumeric identification of the contributor which is providing a particular data element, an alphanumeric identification of the source of the information (that is, which particular document or process derived the information), an alphanumeric time/date stamp which identifies the time and date at which a particular data entry is entered or modified, and an optional alphanumeric ranking of probability of accuracy which is derived by the contributor which is providing the data element, and one or more data elements which are uniquely identified by the preceding information. The data element may include information such as: an individual's name, an individual's date of birth, an individual's social security number, an individual's address, or any other data element which specific to the monitored-entity.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A and 6B are block diagram views of data items which can be generated in accordance with one embodiment of the data sharing operation of the present invention and an exemplary view rule set;

DETAILED DESCRIPTION OF THE INVENTION

Figure 1:
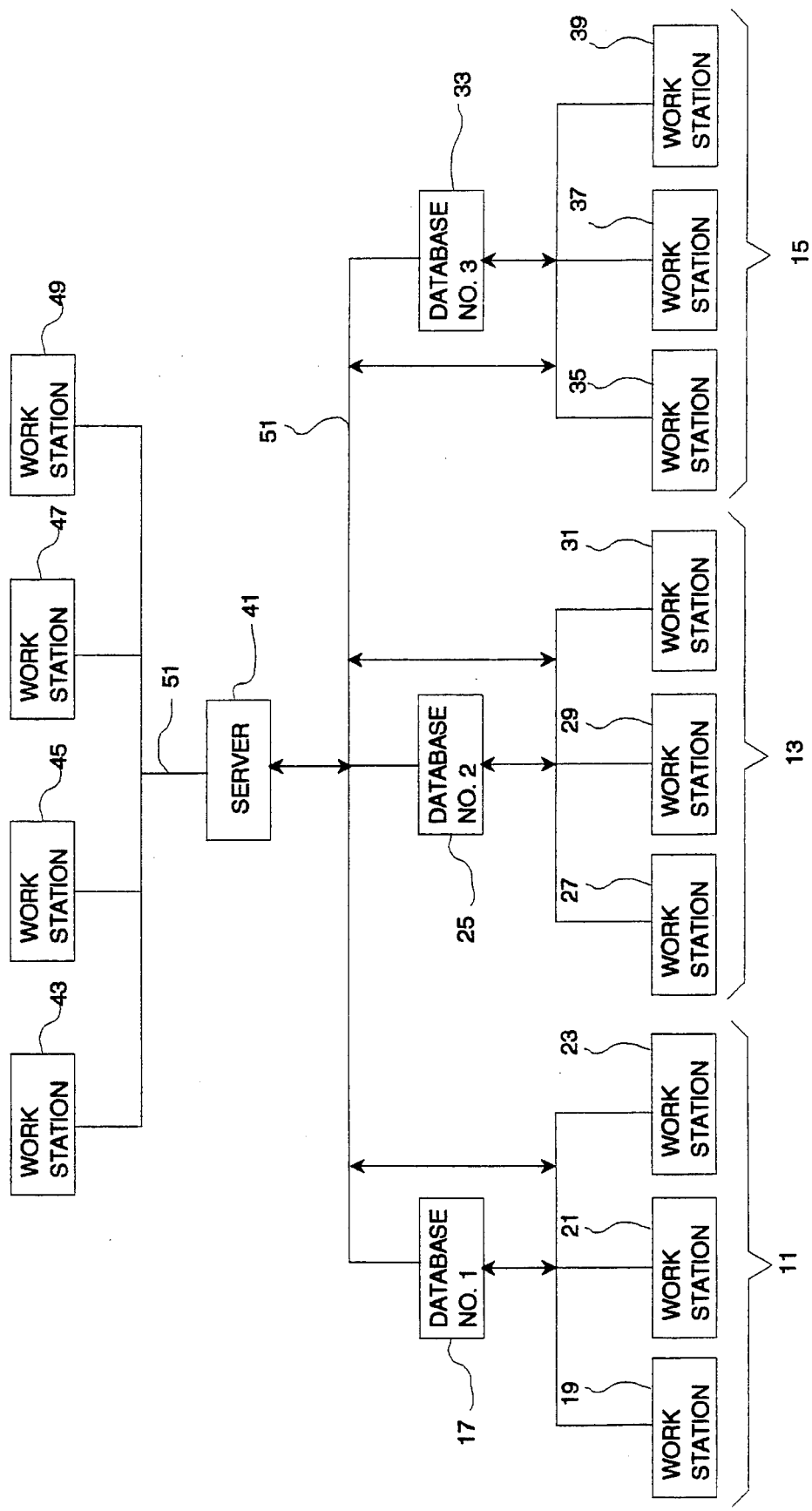
FIG. 1 is a schematic view of one embodiment of a data sharing operation conducted in accordance with the present invention.
Figure 2A:
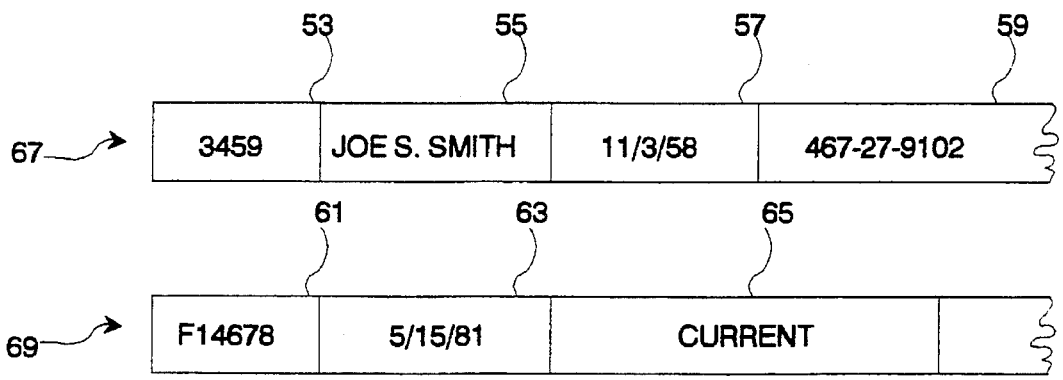
FIGS. 2A, 2B, and 2C provide a block diagram of three types of exemplary databases which are to be coordinated in accordance with the data sharing operation accordance with the present invention.

FIG. 1 is a schematic view of one embodiment of a data sharing operation conducted in accordance with the present invention. Contributor 11 has a significant investment in database 17 which has been created and maintained at considerable expense over a significant time interval. Database 17 is adapted to communicate with a plurality of workstations, such as workstation 19, workstation 21, and workstation 23, in a network in a conventional manner. FIG. 2A provides a block diagram view of exemplary data fields which may be contained in database 17. These data fields fall into two broad types: the monitored-entity subset of data fields 67, and a contributor-specific subset of data fields 69. The monitored-entity subset of data fields 67 include a reference numeral 53 which is utilized in database 17 to identify the entity for which the record applies. Name field 55 includes the name of the monitored entity. Date of birth field 57 includes the date of birth of the monitored entity. Social security number field 59 includes the social security number of the monitored entity. Most of the items in the monitored-entity subset of data fields 67 pertain to Joe S. Smith. These items are typically provided to contributor 11 by Joe Smith, and they may or may not be completely accurate. The contributor-specific subset of data fields 69 includes information which is generated by contributor 11 and which is thus less likely to include inaccuracies. The information contained in contributor-specific subset data field 69 could include information which is mistyped or otherwise erroneous due to the actions of contributor 11. In the example of FIG. 2A, contributor-specific subset of data field 69 include a license number field 61, a date field 63 which is attached to the license and which identifies the issue date of the license, and a status field 65 which identifies the current status of Joe Smith. The data fields depicted in block diagram form in FIG. 2A, are exemplary of the type of data which is issued by a licensing agency, such as a state bar organization, or medical licensing agency.

Figure 2B:
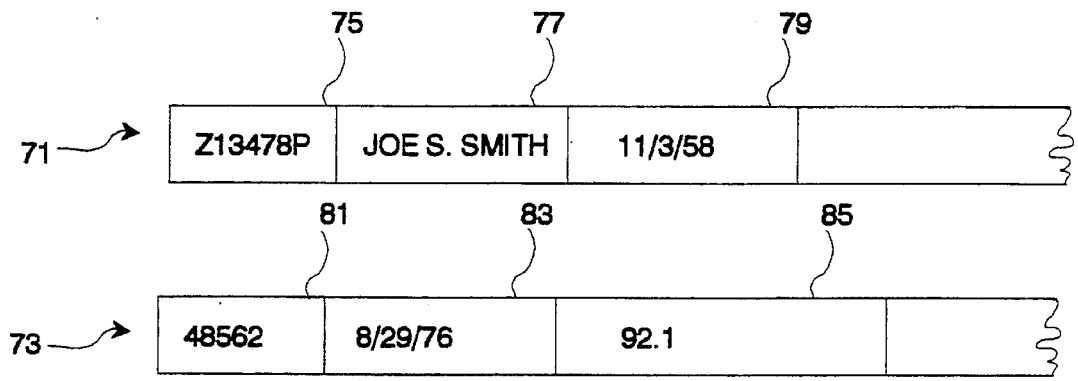

Returning now to FIG. 1, contributor 13 has developed and maintained database 25 which includes information about a plurality of monitored entities. Database 25 is connected over a conventional network to a plurality of workstations, such as workstation 27, workstation 29, and workstation 31. FIG. 2B depicts in block diagram form exemplary data fields of the type which may be maintained in database 25 by contributor 13. The plurality of data fields depicted in FIG. 2B pertain to a monitored entity, namely Joe S. Smith, and can be divided into two subsets: a monitored-entity subset of data fields 71, and a contributor-specific subset of data fields 73. The monitored-entity subset of data field 71 include account number field 75, name field 77, and date of birth field 79. These pieces of information pertain to Joe S. Smith, and may be inaccurate, since at least the name field 77 and date of birth field 79 include information which may have been provided by Joe Smith. In contrast, the contributor-specific subset of data fields 73 include information which is generated as a result of the interaction between contributor 13 and Joe Smith. For example, vendor certificate field 81 is provided. Date field 83 is provided which provides the date of the vendor certificate. Vendor rating field 85 provides a quality rating for the vendor. The information contained in contributor-specific subset of data field 73 may include inaccuracies due to typographical and other errors, but will not typically include errors which arise as a result of communication (or miscommunication) with the monitored entity (Joe Smith).

Figure 2C:
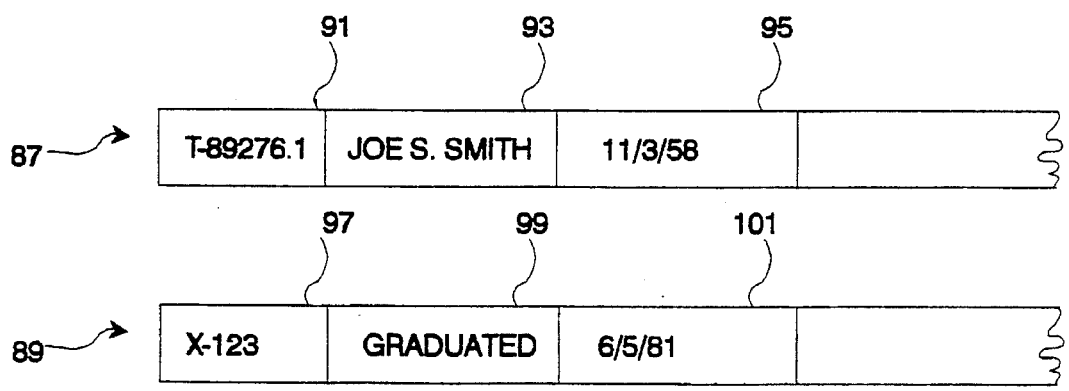

Returning now to FIG. 1, contributor 15 has expended considerable sums in creating and maintaining database 33. Database 33 is coupled through a network to workstations 35, 37, and 39, in a conventional manner. FIG. 2C provides a block diagram view of the types of data which may be maintained in database 33. Once again, this information can be divided into two subsets of fields, including: a monitored-entity subset of data fields 87, and a contributor-specific subset of data fields 89. The monitored-entity subset of data fields 87 includes a student number field 91, a name field 93, and a date of birth field 95. The contributor-specific subset of data fields 89 includes degree plan field 97, status field 99, and date field 101. The information contained in contributor-specific subset of data fields 89 may be inaccurate due to miskeying or other types of errors, but it typically is not inaccurate due to miscommunication with the monitored entity (Joe Smith).

Returning now to FIG. 1, database 17, 25, 33 may be separately maintained after a collaborative venture between contributors 11, 13, and 15. Server 41 is provided for performing the data sharing functions of the present invention. Server 41 typically includes a data processing system, and communicates with databases 17, 25, 31, as well as the workstations associated therewith through data bus 51, in accordance with conventional networking technologies. Preferably, if contributors 11, 13, and 15 are remotely located from one another, telephone lines serve as intermittent data buses to allow communication. Data bus 51 also allows communication between server 41 and workstations 43, 45, 47, and 49. The collaboration between contributors 11, 13, and 15 may result in the creation of a collaboration entity, but this is not necessary since the present invention allows for the creation of a "virtual" database from the data contained in databases 17, 25, and 33. If an actual collaborative entity is formed, workstations 43, 45, 47, and 49 would be useful, but if no collaborative entity is formed, and if the combined database is in fact a "virtual" database, or if multiple copies of virtual databases are not maintained workstations 43, 45, 47, and 49 are not needed.

Figure 3:
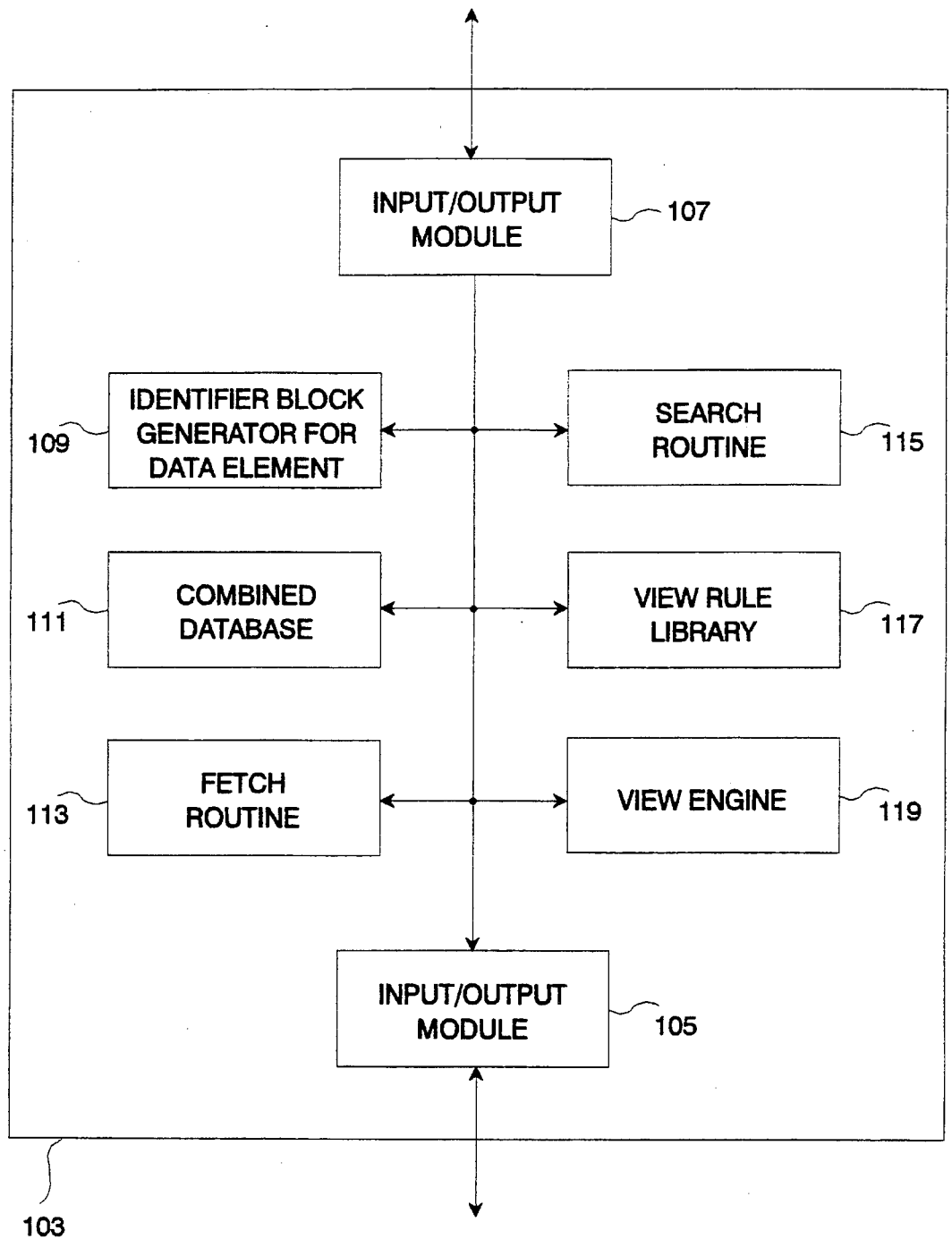
FIG. 3 is a block diagram view of a record management program which implements the data sharing operations of the present invention.

A record management computer program is resident in server 41, and performs the essential functions to allow trouble-free recollaboration between contributors 11, 13, and 15, whether or not a collaborative entity exists. FIG. 3 depicts the preferred record management program in the present invention in block diagram form. Additional figures are utilized to provide details for the functional blocks provided in FIG. 3. Record management program 103 includes an input/output module 105 which facilitates communication via data bus 51 with contributors 11, 13, 15. Input/output module 107 facilitates communication with workstations which are under the control of the collaborative enterprise, if one exists. Record management program 103 further includes identification block generator 109, search routine 115, view rule library 117, and view engine 119. If an actual database is to be created, record management program 103 includes combined database 111. An alternative technique is to utilize record management program 103 to fetch the data items from databases 17, 25, 33, as required. This alternative is depicted as fetch routine 113. Identification block generator 109 allows data items to be handled in an orderly fashion. Preferably, identification block generator 109 generates a unique identifier for each of the plurality of monitored entities in databases 17, 25, 33, and will be discussed in detail below in connection with FIGS. 4 and 5. View engine 119 is provided in record management program 103 to receive data developed in response to the operation of search routine 115, and to assemble the data for display in accordance with the particular viewing prioritization rule set associated with the particular contributor who requested the search. The viewing prioritization rule sets for each of contributors 11, 13, and 15 are set forth in view rule library 117. View engine 119 further operates to identify and automatically resolve conflicts between information in the monitored-entity subset of the plurality of data fields, in accordance with the particular viewing prioritization rule set attributed to or associated with the contributor who requested the data. The operation of view rule library 117 and view engine 119 will be described in greater detail in connection with FIGS. 6A, 6B and 7 herebelow. Input/output modules 105, 107 may be utilized to restrict certain types of data from modification by all but one contributor which is uniquely identified to that data, in a manner which will be described herebelow in connection with FIG. 8. Furthermore, input/output modules 105, 107 may be utilized to allow the merging of records under certain circumstances, as will be described in connection with FIG. 9.

Figure 4:
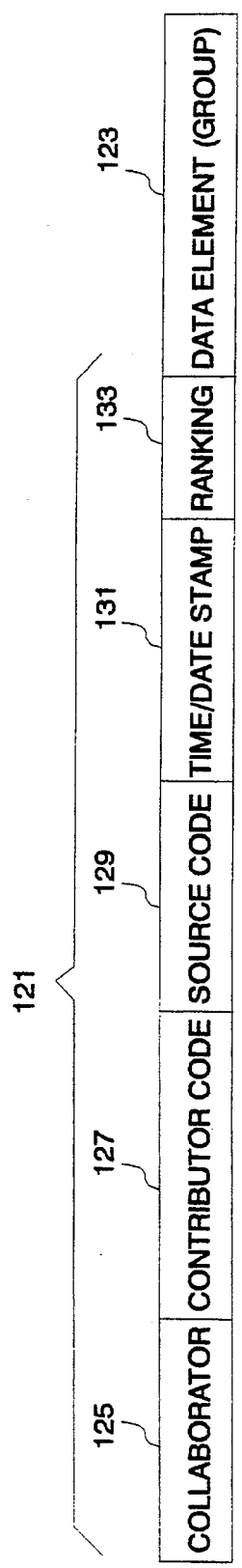
FIG. 4 provides a block diagram view of an exemplary identification block which maybe utilized to identify data elements in a data sharing operation conducted in accordance with the present invention.

Before any particular data item may be entered into combined database 111, or before any data item already existing in combined database 111 is modified, an identification block must be provided or generated. If a new monitored-entity is being introduced into combined database 111, identification block generator 109 is utilized to generate a new identification block; however, if an existing data item within combined database 111 is being modified, no new identification block must be generated, but at least portions of the identification block must be provided by an authorized contributor who has both authorization to interact with record management program 103, and who has authorization to alter the particular data item for which modification is sought. FIG. 4 provides a block diagram view of an exemplary identification block and associated data element or elements. In the view of FIG. 4, identification block 121 includes a number of identification fields which are attached to, or associated with, data elements 123. Data elements 123 may comprise a single field, or a group of fields. The information contained in identification block 121 is attached to each field present in data element 123. Identification block 121 includes collaboration identification 125, which is preferably an eight character decimal identification number which can be utilized by contributors 11, 13, 15 (of FIG. 1) to access records. Contributors 11, 13, and 15 may maintain their own internal identification coding, but they should adopt a collaboration identification in order to facilitate searching and other data handling operations. Identification block 121 further includes contributor code 127, which is preferably a two or three character decimal identification number. For example, contributor 11 may be assigned a contributor code of "01", while contributor 13 is assigned a contributor code "02" and contributor 15 is assigned a contributor code "03". Identification block 121 preferably further includes source code 129 which is preferably a six character field which identifies the source used by the contributing party to generate the data within data element 123. Coding for this field may be established by each contributor separately, or by a collaboration between the contributors. The data within source code 129 identifies the types of documents or types of procedures which were utilized to derive the information in data element 123. For example, if the information in data element 123 is a date of birth of a monitored-entity, a table of options may be provided for source code 129. The code "01"may identify that the date of birth was derived from examination of a birth certificate. The code "02" may identify that the date of birth was derived from a passport. The code "03" may identify that the date of birth was identified from a driver's license. The code "04" may identify that the date of birth was derived from some entity other than the monitored-entity. The code "05" may identify that the date of birth was derived from questioning of the monitored-entity by the contributor. Under this hierarchial arrangement, the lower the numeric value for the source code, the greater is the certainty that the date of birth information is accurate. The source code may also identify interaction between the contributor and the monitored-entity. The code "01" may signify that the written documents were exchanged between the contributor and the monitor entity. The code "02" may signify that the monitored-entity was interviewed by the contributor. The code "03" may signify that a battery of interviews of the monitored entity were conducted, and that the information is a result of those interviews. The identification block further preferably includes a time/date stamp 131 which is preferably a ten character decimal field containing date and time information for the information contained in data element 123, coded with two numeric digits for each of the century year, the month, the day, the hour, and the minute. Finally, identification block 121 optionally includes ranking 133 which is preferably a two character decimal value indicating the ranking value of the data within data element 123 relative to other sources for the same element. In other words, ranking 133 provides some measure of the level of confidence of the veracity and accuracy of information contained within data element 123.

Figure 5:
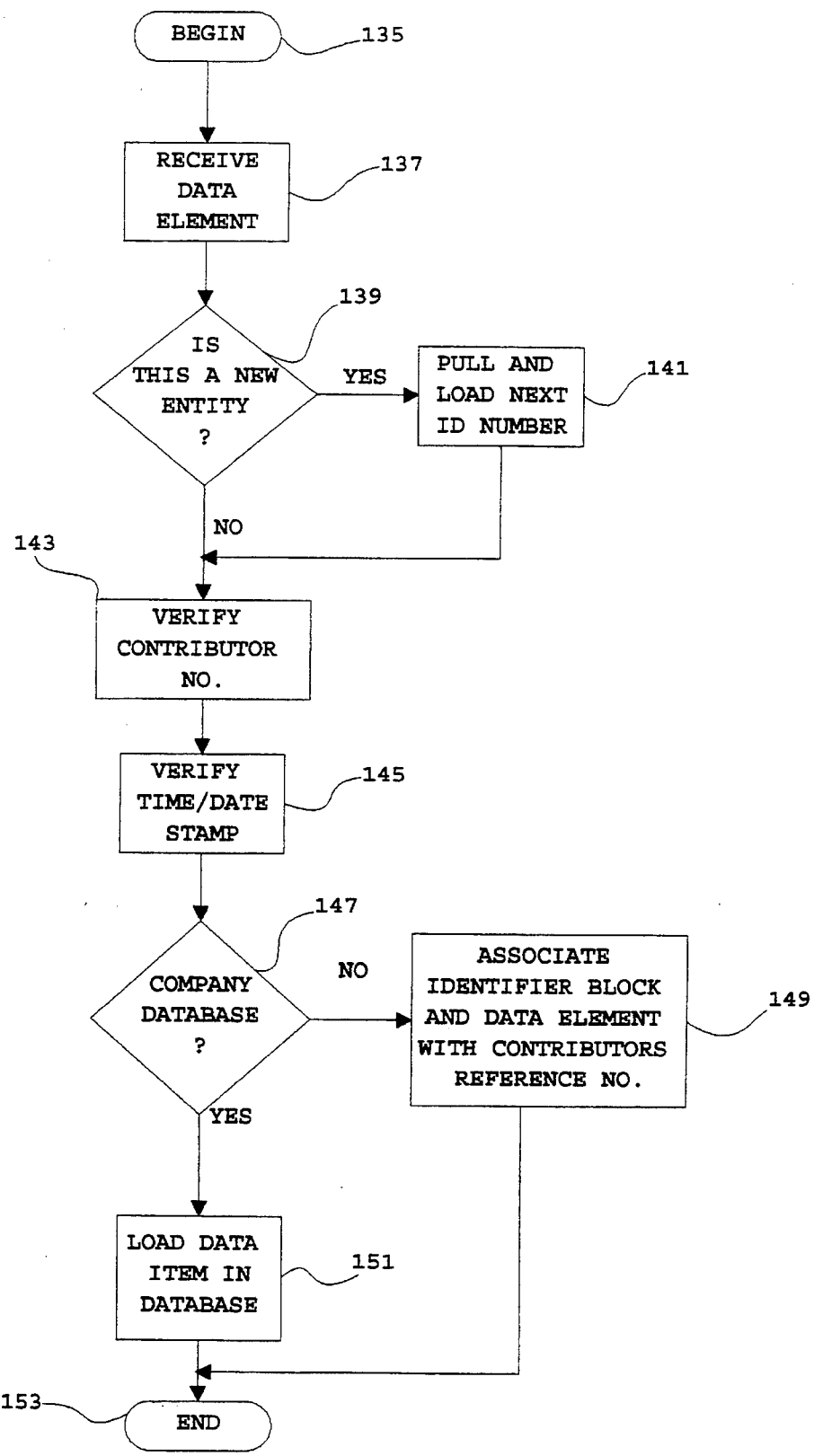
FIG. 5 is a flowchart representation of a routine for handling identification blocks in accordance with one embodiment of the data sharing operation of the present invention.

FIG. 5 provides a flowchart depiction of the basic operation of identification block generator 107 of record management program 103 (of FIG. 3). The process begins at software block 135, wherein contributor attempts to load a data element into combined database 111 (of FIG. 3) utilizing identification block generator 109. The input/output module 105 of record management program 103 receives the communication from the contributor. Communication is directed to identification block generator 109. These steps are signified in the flowchart of FIG. 5 by software block 137. Identification block generator 109 analyzes the information to determine whether a new monitored-entity is being added to database 111, in accordance with software block 139. If the entity is determined to be a new entity, because no collaboration identification 125 is provided, then the process continues at software block 141 by pulling and loading the next collaboration identification number. However, if it is determined in accordance with software block 139 that the data item being directed by a contributor to be loaded into combined database 111 refers to an existing monitored-entity, the process continues at software block 143 by verifying the contributor number from contributor code 127 of identification block 121 of FIG. 4. Then, in accordance with software block 125, the time/date stamp is verified. Software block 147 is utilized to determine whether a combined database exists. In the present invention, an actual database may be created using all the records of all the contributors, and it may be maintained in memory and resident in server 41. Alternatively, server 41 may maintain only addresses for all the data items in the plurality of the databases from all the contributors, and server 41 must then fetch each individual record from each database in order to respond to a query and construct a record. This alternative is signified in FIG. 3 by fetch routine block 113. In yet another alternative embodiment, a plurality of one-dimensional flat views may be provided in the memory of particular ones of database 17, 25, 33, or server 41, or workstations 43, 45, 47, and 49. Each of the one-dimensional flat views are constructed in accordance with a particular viewing prioritization rule set which is derived by a particular one of the independently-operating data-gathering contributors, or by third parties. The view includes a record for each of the monitored-entities which has particular data fields present therein, and which has been constructed in a manner which resolves the discrepancies and ambiguities between data items contained in the monitored-entity subset of the plurality of data fields. In this particular configuration, contributors 11, 13, and 15 may individually access the one-dimensional flat view and perform searches more rapidly than could be accomplished if a full search were conducted over the entire data set created by the combined efforts of contributors 11, 13, and 15.

Returning now to FIG. 5, if a combined database exists, the processing continues at software block 151, wherein the data item is loaded into combined database 111; however, if a combined database does not exist, processing continues at software block 147, wherein the identification block is associated to the data element and the contributor's reference number, to allow fetching operations to be performed in accordance with fetch routine 113. In either event, the processing terminates at software block 153.

Returning now to FIG. 3, the contributing entities should collaborate in determining which particular fields in combined database 11 will be available for searching. Those decisions should be embodied in search routine 115. As is identified in FIG. 4, each data element (or associated group of data elements) is identified with an identification block, which includes a plurality of data fields which provide an indication of the origin of the data, the source of the data, the date of acquisition of the data, and some relative rank of the confidence in the data. Since each data element or group of data elements includes an identification block, it is sensible to allow the searching of one or more of these fields. A more difficult determination to be made is whether fields which are uniquely associated with a particular contributors are to be made available for searching. If they are made available, the searching protocols can become complicated. In the preferred embodiment in the present invention, the search routines should be restricted to either the collaboration identification, the name of the monitored-entity, or the social security number of the monitored-entity, since these fields will typically be associated with most of the significant data items in the combined database 111.

Supposing that a search is requested utilizing a collaboration identification, the search request is received at input/output module 105, which routes the search request to search routine 115, which either (1) directly performs the search operation upon combined database 111 or (2) utilizes fetch routine 113 to fetch the records associated with the collaboration identification number from the databases of the collaborating entities. In either event, a plurality of records are retrieved, and provided to view engine 119. View engine 119 generates a response to the search query which depends upon (1) the particular query, (2) the particular view rule set for the contributor requesting the search, from view rule library 117 which contains all of the view rule sets, and (3) the plurality of records obtained from the search.

Figure 6A:
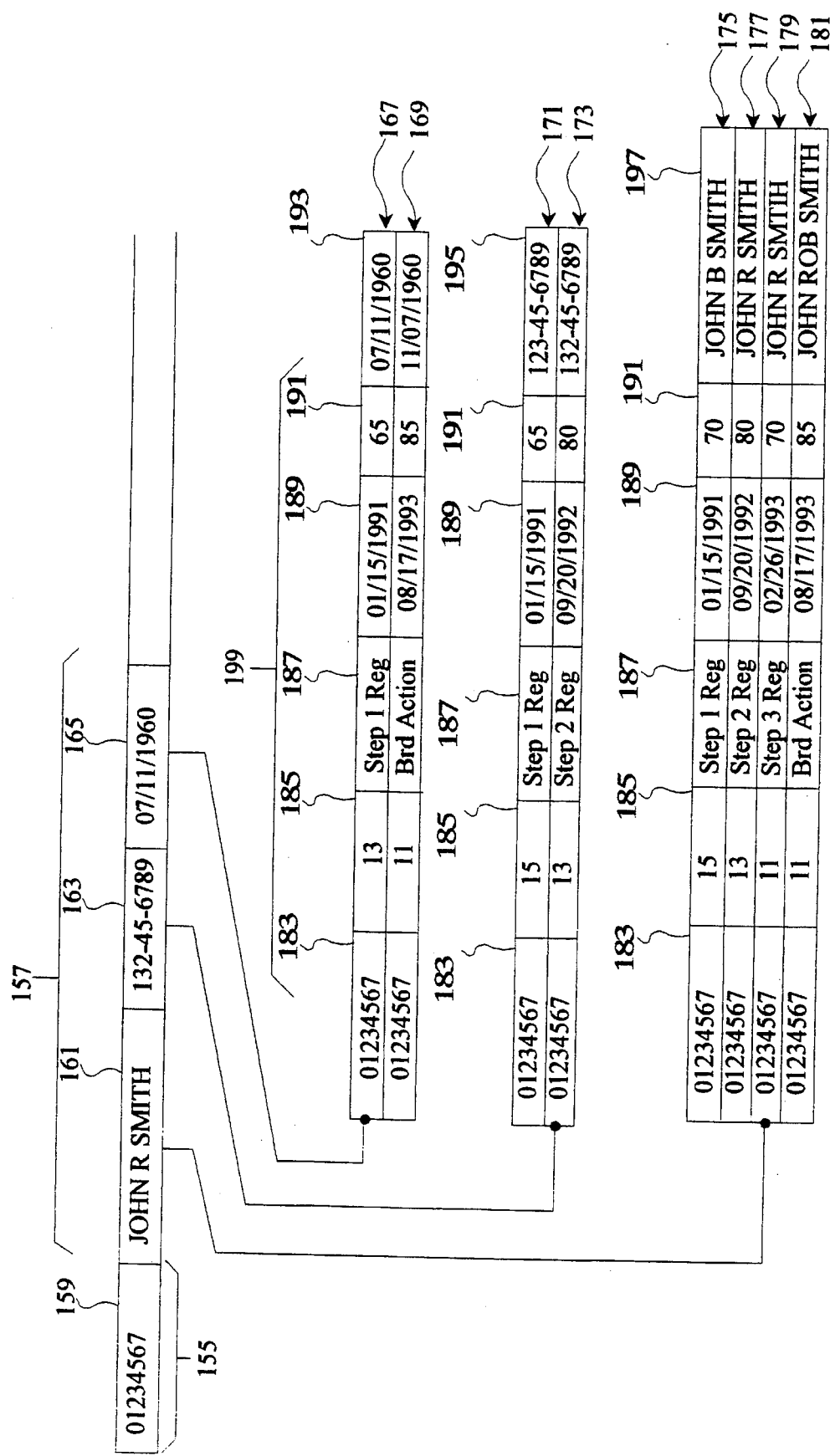

FIG. 6A will now be utilized to describe the operation of view rule library 117 and view engine 119. FIG. 6A graphically depicts a result of utilizing a collaboration identification to search for all records in all of the contributors databases which pertain to that particular collaboration identification. The search produces eight different records, including record 167, 169, 171,173, 175, 177, 179, 181.

The data element associated records 167, 169 is date of birth field 193. The data element associated with data records 171,173 is social security field 195. The data element associated with data records 175, 177, 179, 181 is name field 197. The date of birth field 193, the social security number field 195, and the name field 197 are all preceded by identification block 199. Each identification block includes a collaboration identification 183, a contributor code 185, a source code 187, a time/date stamp 189, and an optional ranking 191. As was discussed above in connection with FIG. 4, the collaboration identification is a unique identifier which is attributed to each monitored-entity. In the example of FIG. 6A, the monitored-entity is "John Smith." The contributor identification 185 identifies which of the particular contributors is responsible for the associated data element. The source code identifies the particular source of the information of the data element, and the date/time stamp 189 identifies the date of the derivation of the information contained in the data element. Ranking 191 provides a measure of confidence of the information contained in the data element.

In FIG. 6A, note that data records 167 and data record 169 contain information in the date of birth field 193 which are inconsistent. Also note that data records 171,173 include information in the social security number field 195 which conflicts. Finally, note that data records 175, 177, 179, 181 contain information within the name field 197 which conflicts. When data elements conflict, view engine 119 (of FIG. 3) accesses the few rule library 117 to determine what rules exist for resolving the conflict between the information contained in a particular data field. FIG. 6B depicts exemplary view rules which are associated with the contributor which is requesting the search which developed the records of FIG. 6A. For purposes of clarity, only three particular rules are discussed. In practice, dozens of rules may be prescribed for resolving conflicts in displaying data. Additionally, multiple views are possible as well. The rules of FIG. 6B resolve conflicts pertaining to the date of birth information, the social security number information, and the name information. Before performing the search, and in fact before actively participating in searching activities, the contributors are provided with a plurality of cascading display screens which set forth a number of available conflict resolution options. The rule set depicted in FIG. 6B is depicted in menu format, with the contributor selections indicated by an "X" next to the particular option. Rule number one is directed to a date of birth conflict, and includes options a through f. The searching party has selected option A which states that if a conflict exists, "select data from contributor (3) over that of other contributors." The result is that the information contained in date of birth field 193 of record 167 is selected over the information contained in date of birth field 193 for record 169. As a result, in composite data item 157, the date of birth field 165 is completed with the information "Jul. 11, 1960". The other options which were available to the contributor are set forth in paragraphs b through f. Paragraph b provides that if a conflict exists over the date of birth, "select data with maximum ranking value if none of (1) records have that data". Option number c provides that if a conflict exists for the date of birth, "select data from earliest record". Option d provides that if a conflict exists over the date of birth, "select data with maximum ranking value only". Option e provides that if a conflict exists for the date of birth, "select data from most recent record". Finally, option f provides that if a conflict exists the date of birth, "select data from contributor ( ) if source is ( )". The selection of another view rule for a date of birth conflict would have resulted in different information being displayed in date of birth field 165. For example, if option e or option d had been selected, the date of birth information provided in record 169 would have been placed in date of birth field 165.

As stated above, a conflict exists within data records 171, 173 for the social security number of the monitored entity. Prior to performing the search, the contributor selected option c for resolution of the conflict, which provides that if a conflict exists, "select data from earliest record." The other options which were available to the contributor include options a, b, and d. Option a provides that if a conflict exists, "select data from contributor ( ) over that of other contributors". Option b provides that if a conflict over the social security number exists, "select data with maximum ranking value, if none of ( ) records have that data". Option d provides that if a conflict exists over social security numbers, "select data with maximum ranking value only". If the contributor had selected option d for a social security number conflict, the information contained in data record 173 would have been placed in social security number field 163, since the ranking of "80" of data record 173 exceeds the ranking of "65" of data record 171.

The third view rule depicted in FIG. 6B pertains to conflicts in the name of the monitored entity. Options a, b, and c are provided. Prior to performing the search, the contributor selected option C, which requires that if a conflict in the name exists, "select data with greatest number of records associated therewith". As can be seen in FIG. 6A, data records 171 and 179 correspond exactly, while data records 175 and 181 contain different information for the middle initial or middle name of the monitore-dentity, with record number 175 identifying the monitored entity as "John D. Smith" and data record 181 identifying the monitored entity as "John Rob Smith". Only data records 177 and 179 correspond exactly, and thus assuring its placement in name field 161 of the composite record 157. The other options which were available to the contributor include option a and option b. Option a provides that if a conflict exists in the name, "selected data from contributor ( ) over that of other contributors". Option b provides that if a conflict in the name exists, "select data with maximum ranking value".

It should be noted that the view rules of FIG. 6B are only exemplary. A wide variety of view rules may be provided in menu format to the contributors for selection. Each contributor may from time-to-time change the view rules as desired, without impacting the operations of the other contributors. This is a significant feature of the present invention, since it allows a plurality of contributors to weigh or value the data in their own unique ways without requiring the consent or collaboration of the other contributors. This means that there would be very little impact upon the day to day operations of creating and maintaining a database for each contributor. With a few exceptions, each contributor may maintain its initial business configuration, and may maintain its database as it sees fit. As business and operating conditions change over time, the contributors may choose to alter their view engines. This may be true if experience proves one or more of the contributors to have more accurate data than the other contributors. This can be useful even if one or more contributors have more accurate data only for a portion of the data fields, with less accurate data for portions of others. Each contributor may determine through the view rule set how it is to view the data gathered through searching operations. A contributor may identify the most accurate sources of particular types of information, and then bias the view rule set to favor particular contributors for particular types of data over other contributors. If circumstances alter these conditions, the contributors may change their view rule set to generate a different type of composite record.

Figure 7:
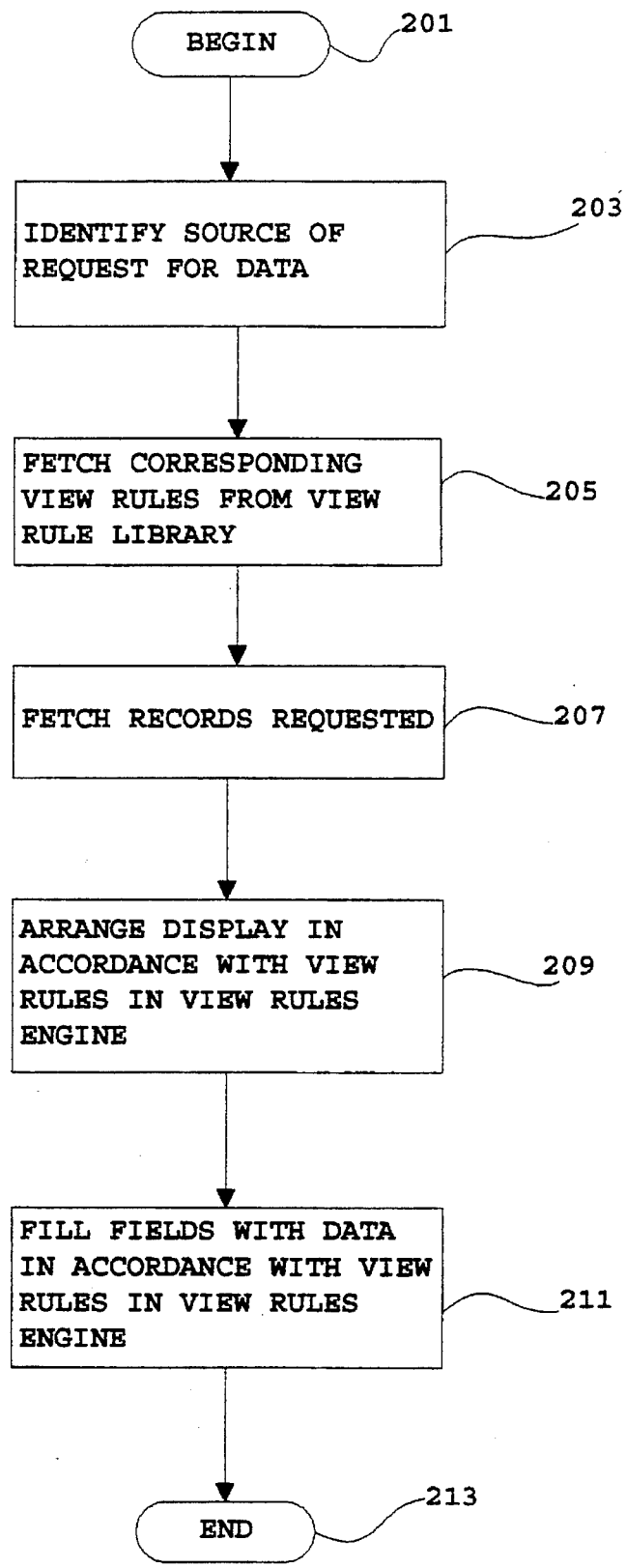
FIG. 7 is a flow chart representation of an exemplary routine for arranging data items for display in response to contributor-selected view rules.
Figure 8:
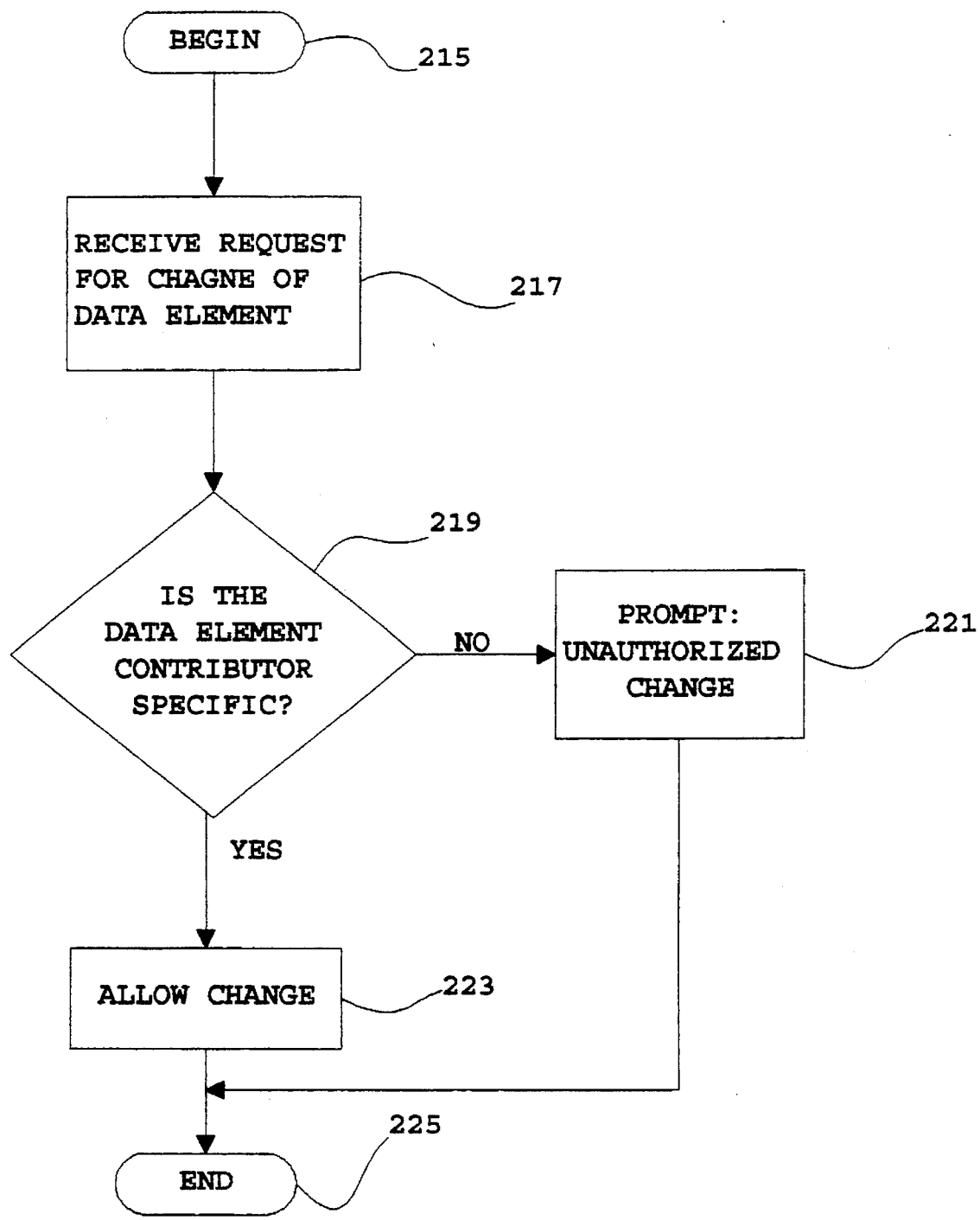
FIG. 8 is a flowchart representation of an exemplary routine for allowing or disallowing the modification of data items under the data sharing operation of the present invention.

FIG. 7 provides in flowchart form a broad overview of the operation of the view engine 119 (of FIG. 3). The process begins at software block 201, and continues at software block 203 wherein record management computer program 103 (of FIG. 3) of server 41 (of FIG. 1) identifies the source of a request for data. In accordance with software block 205 record management computer program 103 fetches the corresponding view rules from view rule library 117. Then, in accordance with software block 207, record management computer program 103 fetches the records requested. Then, in accordance with software block 209, record management computer program 103 arranges a display in accordance with the view rules in the view rule engine 117 which are identified with the requesting entity. Next, in accordance with software block 211, record management computer program 103 fills the fields in the display with the data in accordance with the view rules in the view rule engine. As discussed above, all conflicts are solved, to provide the data in accordance with the desires of the requesting party. The process ends at software block 213.

The data sharing method of the present invention contains another significant advantage over the prior art. This advantage is that each contributor maintains the power and right to unilaterally modify any record that has been previously generated by it and contributed to the database. This technique is set forth in flowchart form in FIG. 8. The process begins at software block 215, and continues at software block 217, wherein the record management computer program 103 receives a request for change of a data element. Next, in accordance with software block 219, record management computer program 103 determines whether the data element is associated with the contributor requesting to make the change; if so, the process continues at software block 223, by allowing the change; however, if the data element is not associated with the contributor requesting to make the change, the process continues at software block 221, wherein a prompt is provided noting that the change isn't authorized. In either event, the process terminates at software block 225.

Figure 9:
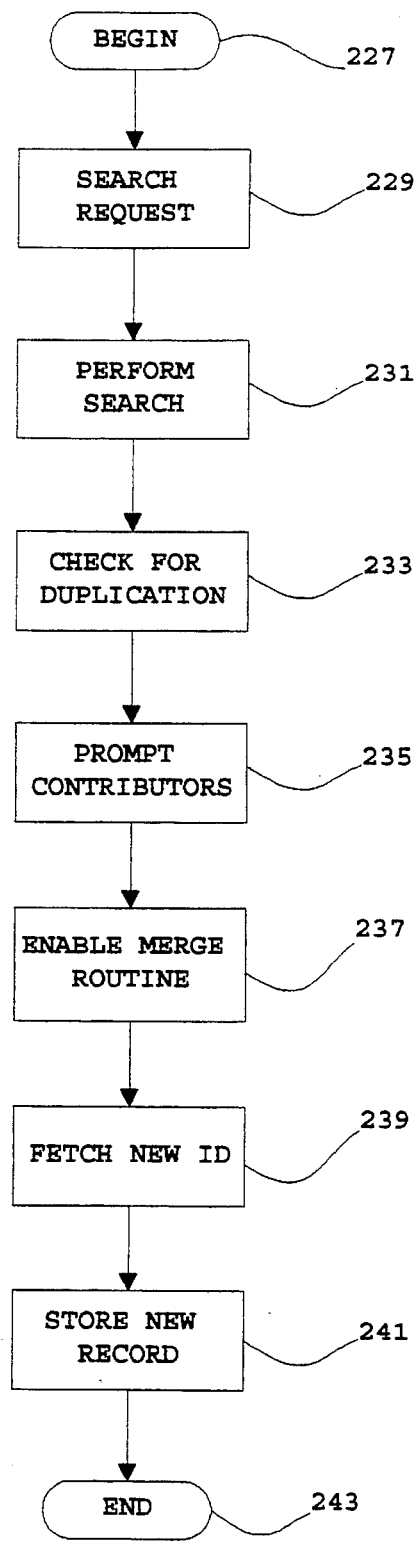
FIG. 9 is a flowchart representation of an exemplary routine for combining records under the data sharing operation of the present invention.

Therefore, two very significant functions are maintained within the control of the particular contributors. Each contributor may determine how conflicts among data elements are resolved, and how data is to be displayed. Additionally, each contributor can unilaterally, and without prior approval, alter any data item with which it is associated. One day-to-day activity does require the coordinated efforts of the contributors. This activity is the merging of information contained under separate collaboration identification numbers, but which otherwise appear to pertain to the same monitored entity. When this occurs, the records must be merged, but only after all of the involved contributors have an opportunity to study the problem, comment, and perhaps vote their preference. This process may be automated utilizing pre-agreed resolution rules, such as a resolution of the merger based upon which entity has the first or least entity for the particular monitored entity, or other predefined criteria. Having a portion of the records pertaining to a particular monitored entity under one collaboration identification while other records pertaining to the monitored entity are contained under another collaboration identification presents a serious problem; preferably some periodic automated checking be performed to identify likely candidates for combination. FIG. 9 sets forth in flowchart form the broad concepts of this periodic checking. The process begins at software block 227. A search of some type is requested in software block 229, and performed in accordance with software block 231. Then, in accordance with software block 233, the record management computer program 103 (of FIG. 3) checks for duplication among the records. If duplication is discovered, the contributors are prompted in accordance with software block 235. A merge routine is enabled in accordance with software block 237, if all the affected contributors agree to the merger. Then, in accordance with software block 239, a new collaboration identification is fetched, and attached to the data elements, which are stored in memory in accordance with software block 241. The process ends at software block 243.

Figure 10:
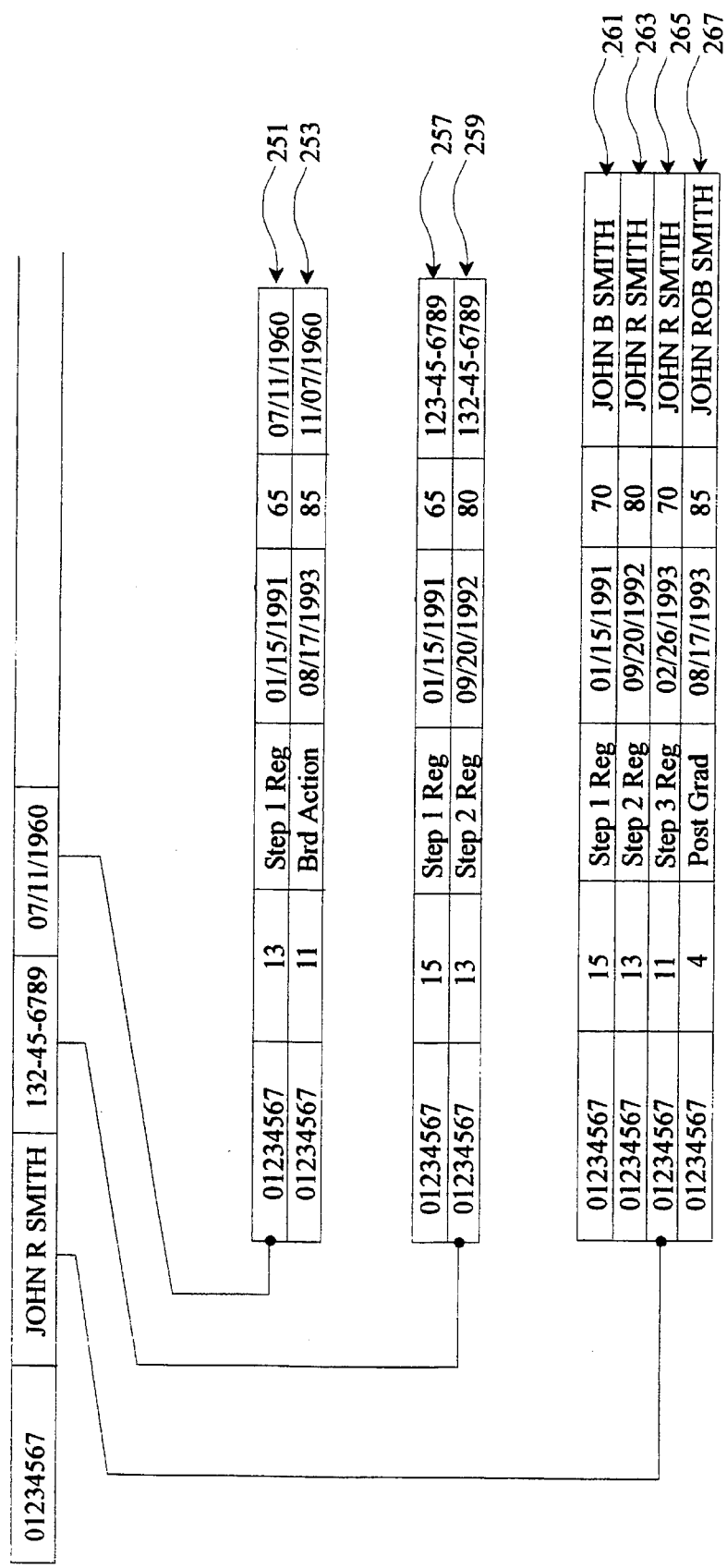
FIGS. 10 and 11 provide block diagram views of data items which can be generated in accordance with two different viewing prioritization rule sets.
Figure 11:
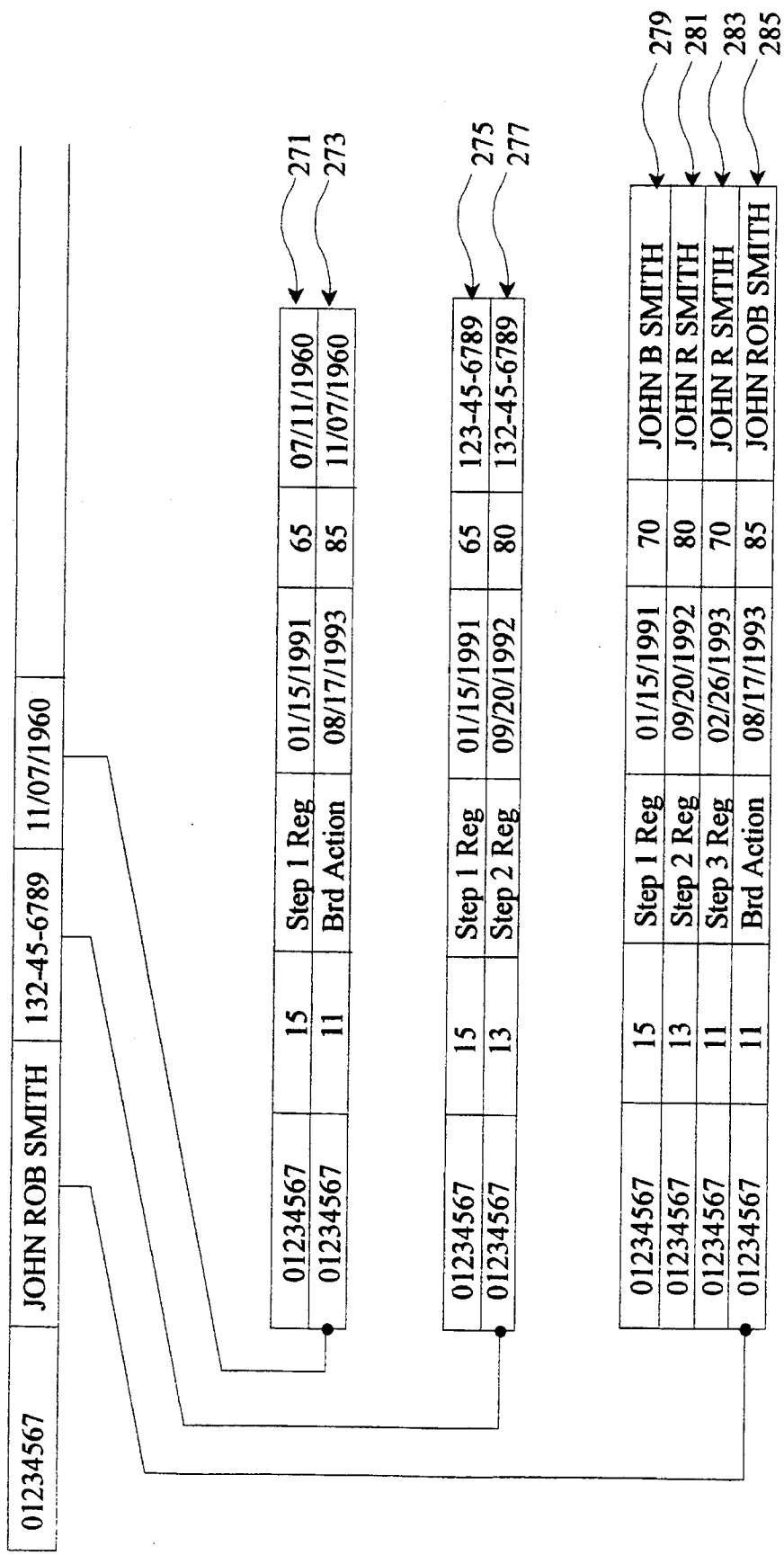

FIGS. 10 and 11 provide block diagram views of data items which can be generated in accordance with two different viewing prioritization rule sets, with FIG. 10 depicting the utilization of a viewing prioritization rule set which displays the most recent contributor information. In FIG. 10, the monitored-entity subset of the plurality of data fields include a name field, a social security number field, and a date of birth field. Inconsistencies in the records for these fields are resolved in accordance with the view rule of displaying the most recent contributor information. In this example, contributors 11, 13, and 15 provide all the records depicted in FIG. 10, with the exception of a record provided by contributor 4. Contributor 4 is a third-party that is only peripherally involved in the collaboration. The view rule for the resolving the discrepancies and inconsistencies is that the most recent contributor (contributor 11, 13, 15) information is displayed. As is shown in FIG. 10, data records 251, 253 include information in the date of birth field that is inconsistent. The view rule requires that the most recent contributor information be displayed, so the date of birth information contained in data record 253 is displayed (Nov. 7, 1960) instead of the data contained in data record 251 (Jul. 11, 1960). As is shown in FIG. 10, the data contained in the social security number field of data records 257, 259 is inconsistent. In accordance with the view rule of displaying only the most recent contributor information, the information contained in the social security number field of data record 259 (132-45-6789) is displayed instead of the information contained in the social security number field of data record 257 (123-45-6789). As is shown in FIG. 10, the name field of data records 261, 263, 265, 267 include inconsistent information. In accordance with the view rule of the displaying only the most recent contributor information, the information contained in data record 265 (John R. Smith) is displayed instead of the information contained in the other data records 261, 263, 267. Note that data record 267 originates from a contributor which is not one of the three collaborating contributors 11, 13, 15. In accordance with the view rule of displaying only the most recent contributor information, the information contained in the name field of data record 267 is ignored, even though it is the most recent of all the records which include inconsistent information.

FIG. 11 depicts another example of a view rule which requires that the highest ranking data of contributor 11 be displayed, or that the most recent data be displayed. Note that data records 271, 273 include information in the date of birth field which is inconsistent. In accordance with the view rule, data record 263 which originated from contributor 11 is selected, since it contains a rank of 85 which is higher than the rank of 65 for data record 271. Note that data records 275, 277, include inconsistencies in the social security number field. Since neither of these data records originated from contributor 11, the most recent data record (data record 277) is selected over data record 275, and the data contained in the social security number field of data record 277 is selected. Note also that data records 279, 281, 283, 285 include information in the name field which is inconsistent. The view rule requires that the highest ranking data from contributor 11 be provided, if it exists. Since data records 283, 285 originate from contributor 11, their rankings are compared, and the information contained in the name field of data record 285 is selected over the information contained in the name field of data record 283, since data record 285 has a rank of 85, while data record 283 has a rank of 70.

In accordance with the present invention, the contributors 11, 13, 15 or other entities having access to the data records may predefine one or more one-dimensional flat view databases which are maintained at a particular predefined location. For example, contributor 11 may utilize the view rule which is depicted and described in connection with FIG. 11 to create a one-dimensional flag database which is maintained locally at database 17. This one-dimensional data set has data elements with the inconsistencies and discrepancies pre-resolved. This allows contributor 11 to search this data set much more quickly than could be done utilizing server 41 and resolving each inconsistency or discrepancy as it arises. In contrast, contributor 15 may utilize the view rule which is depicted and described in connection with FIG. 10 to create its own one-dimensional flat database which can be maintained within database 33 to allow more rapid and efficient searching of the records than could be accomplished utilizing server 43 in a search of all the records with the inconsistencies and discrepancies being resolved as they are encountered.

While the invention has been shown in only one of its forms, it is not thus limited but is susceptible to various changes and modifications without departing from the spirit thereof.

what is claimed is:

1. An apparatus for sharing data among a plurality of cooperating but independently-operating data-gathering contributors, each maintaining a database with information therein pertaining to a plurality of monitored entities arranged in a plurality of data fields, comprising:

(a) a data processing system;

(b) a record management program which is executed by said data processing system, and which includes at least:

(1) a search routine which responds to a search query from a particular contributor by retrieving data; and (2) a view routine which assembles data for display in accordance with a particular viewing prioritization rule set associated with said particular contributor, and which automatically resolves conflicts between information in a monitored-entity subset of said plurality of data fields in accordance with said particular viewing prioritization rule set.

2. An apparatus for sharing data according to claim 1, wherein said record management program further includes:

(3) a view rule library with a plurality of particular prioritization rule sets therein, each being associated with a particular one of said plurality of cooperating but independently-operating data gathering contributors.

3. An apparatus for sharing data according to claim 1, wherein said record management program further includes:

(3) an identification block generator which generates a unique identifier for each of said plurality of monitored entities in said databases of said plurality of cooperating but independently-operating data-generating contributors.

4. An apparatus for sharing data according to claim 1, wherein said monitored-entity subset of said plurality of data fields comprises a plurality of biographical data fields which pertain to said plurality of monitored entities.

5. An apparatus for sharing data according to claim 1, wherein said record management program further includes:

(3) means for directing information from said data processing system to said particular contributor including information contained in (a) a contributor-specific subset of said plurality of data fields and (b) said monitored-entity specific subset of said plurality of data fields.

6. A method of sharing data among a plurality of cooperating but independently-operating data-gathering contributors, each maintaining a database with information therein pertaining to a plurality of monitored entities arranged in a plurality of data fields, comprising the method steps of:

(a) identifying for each database a contributor-specific subset of said plurality of data fields which contains information about said plurality of monitored entities which is uniquely associated with a particular one of said plurality of cooperating but independently-operating data-gathering contributors;

(b) identifying for each database a monitored-entity subset of said plurality of data fields which contains information about said plurality of monitored entities which is not uniquely associated with a particular one of said plurality of cooperating but independently-operating data-gathering contributors and which appears in a plurality of said databases;

(c) deriving a viewing prioritization rule set for each of said cooperating but independently-operating data-gathering contributors;

(d) providing a data processing system;

(e) providing a record management program which is executed by said data processing system, and which includes at least:

(1) a search routine which responds to a search query from a particular contributor by retrieving data; and (2) a view routine which assembles data for display in accordance with a particular viewing prioritization rule set associated with said particular contributor, and which automatically resolves conflicts between information in said monitored-entity subset of said plurality of data fields in accordance with said particular viewing prioritization rule set.

7. A method of sharing data according to claim 6, wherein said record management program further includes:

(3) an identification block generator which generates a unique identifier for each of said plurality of monitored entities in said databases of said plurality of cooperating but independently-operating data-generating contributors.

8. A method of sharing data according to claim 6, wherein said monitored-entity subset of said plurality of data fields comprises a plurality of biographical data fields which pertain to said plurality of monitored entities.

9. A method of sharing data according to claim 6, further comprising:

(f) directing a search query from a particular contributor to said data processing system for information about a particular one of said plurality of monitored entities;

(g) utilizing said data processing system for retrieving data pertaining to said particular one of said plurality of monitored entities;

(h) utilizing said data processing system for determining if conflicts exist between information in said monitored-entity subset of said plurality of data fields;

(i) utilizing said data processing system for automatically resolving conflicts which exist between information in said monitored-entity subset of said plurality of data fields; and (j) directing information from said data processing system to said particular contributor.

10. A method of sharing data according to claim 9, wherein said step of directing information comprises:

directing information from said data processing system to said particular contributor including information contained in (a) said contributor-specific subset of said plurality of data fields and (b) said monitored-entity specific subset of said plurality of data fields.

11. A method of sharing data among a plurality of cooperating but independently-operating data-gathering contributors, each maintaining a database with information therein pertaining to a plurality of monitored entities arranged in a plurality of data fields, comprising the method steps of:

(a) identifying for each database a contributor-specific subset of said plurality of data fields which contains information about said plurality of monitored entities which is uniquely associated with a particular one of said plurality of cooperating but independently-operating data-gathering contributors;

(b) identifying for each database a monitored-entity subset of said plurality of data fields which contains information about said plurality of monitored entities which is not uniquely associated with a particular one of said plurality of cooperating but independently-operating data-gathering contributors and which appears in a plurality of said databases;

(c) deriving a viewing prioritization rule set for each of said cooperating but independently-operating data-gathering contributors;

(d) providing a data processing system;

(e) providing a record management program which is executed by said data processing system, and which includes at least:

(1) a search routine which responds to a search query from a particular contributor by retrieving data; and (2) a view routine which assembles data for display in accordance with a particular viewing prioritization rule set associated with said particular contributor, and which automatically resolves conflicts between information in said monitored-entity subset of said plurality of data fields in accordance with said particular viewing prioritization rule set;

(f) applying said view routine to said plurality of data fields to generate at least one one-dimensional database with inconsistencies being resolved in accordance with a particular viewing prioritization rule set.

12. A method of sharing data according to claim 11, wherein said record management program further includes:

(3) an identification block generator which generates a unique identifier for each of said plurality of monitored entities in said databases of said plurality of cooperating but independently-operating data-generating contributors.

13. A method of sharing data according to claim 11, wherein said monitored-entity subset of said plurality of data fields comprises a plurality of biographical data fields which pertain to said plurality of monitored entities.

14. A method of sharing data according to claim 11, further comprising:

(g) directing a search query from a particular contributor to said data processing system for information about a particular one of said plurality of monitored entities;

(h) utilizing said data processing system for retrieving data pertaining to said particular one of said plurality of monitored entities from a particular one of said at least one one-dimensional data set; and (i) directing information from said data processing system to said particular contributor.

15. A method of sharing data according to claim 14, wherein said step of directing information comprises:

' directing information from said data processing system to said particular contributor including information contained in (a) said contributor-specific subset of said plurality of data fields and (b) said monitored-entity specific subset of said plurality of data fields.

* * * * *